March 3, 1953 — J. H. LIPSHUTZ — 2,630,389
CONFECTION PRODUCT
Filed Nov. 17, 1950
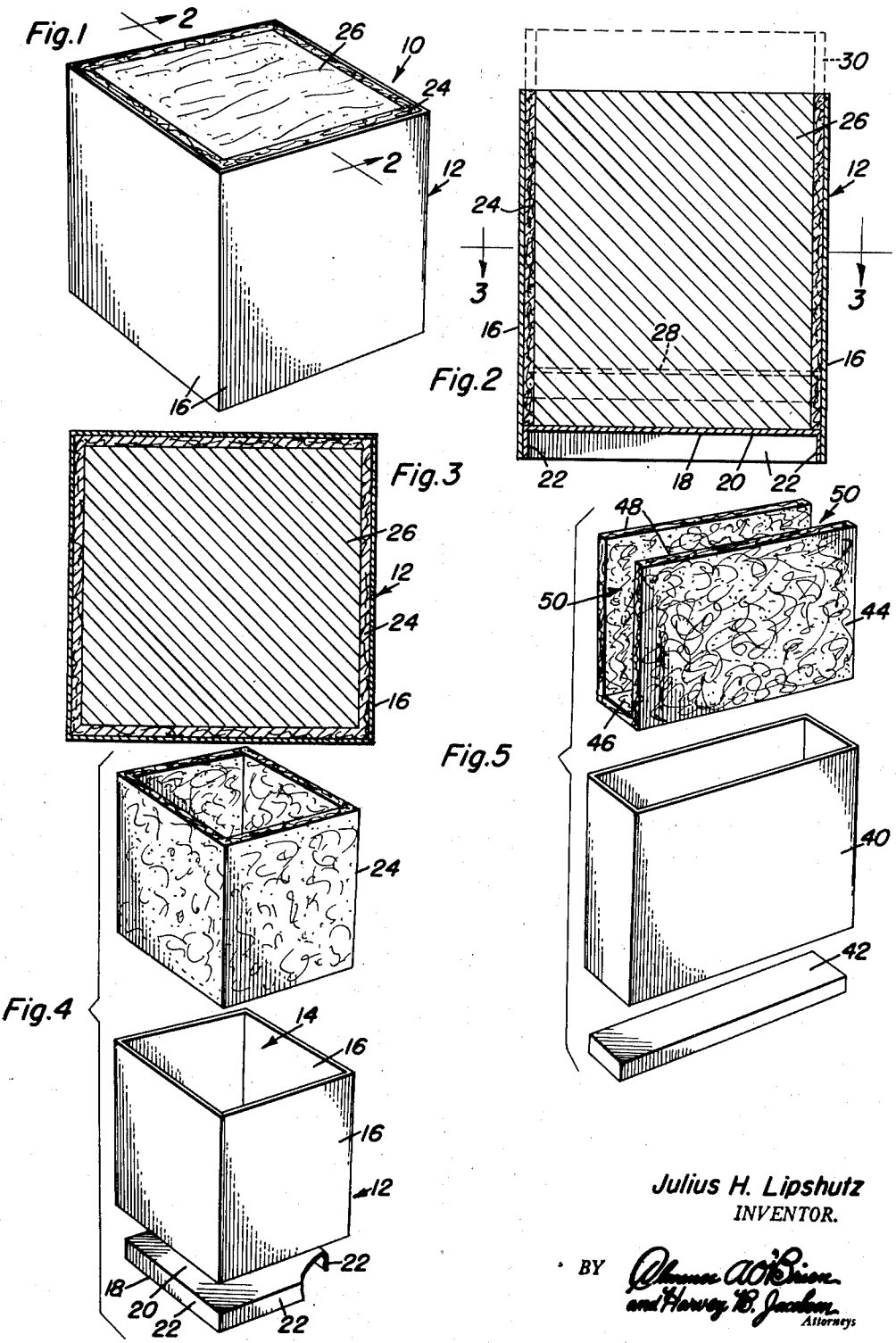
Julius H. Lipshutz
INVENTOR.

Patented Mar. 3, 1953

2,630,389

UNITED STATES PATENT OFFICE 2,630,389

CONFECTION PRODUCT

Julius H. Lipshutz, Brooklyn, N. Y.

Application November 17, 1950, Serial No. 196,303

1 Claim. (Cl. 99—180)

This invention relates to new and useful improvements and structural refinements in food products, more particularly, food products of the frozen confectionery variety, and the principal object of the invention is to facilitate convenient handling and consumption of the confection without soiling the fingers of the person eating the same.

Specifically, the invention contemplates the provision of an ice cream filler in an edible enclosure or shell which, in turn, is slidably positioned within a non-edible container having a slidable bottom, so that by simply sliding the bottom upwardly, the edible shell together with the filler therein may be projected from the container for purposes of consumption, while the container itself may be handled in a sanitary manner without soiling of the fingers and without the fingers actually coming in contact with the food.

Some of the advantages of the invention reside in its simplicity, in its pleasing and attractive appearance, and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a perspective view of the invention;

Figure 2 is a vertical sectional view thereof, taken substantially in the plane of the line 2—2 in Figure 1;

Figure 3 is a transverse sectional view, taken substantially in the plane of the line 3—3 in Figure 2;

Figure 4 is an exploded perspective view, the edible shell being shown empty, and Figure 5 is an exploded perspective view, similar to that shown in Figure 4, but illustrating a modified embodiment of the invention.

Like characters of reference are employed to designate like parts in the specification and throughout the several views.

Referring now to the accompanying drawings in detail, more particularly to Figures 1-4, inclusive, the invention is embodied in a food product which is designated generally by the reference character 10 and comprises a box-shaped container 12 formed from non-edible material such as stiff paper, or the like, the container 12 having an open top 14 and including a set of side walls 16, as shown.

The container 12 also includes a slidable bottom 18 which consists of a horizontal panel 20 provided with downturned flanges 22 at its marginal edges, the flanges 22 slidably engaging the inner surfaces of the respective side walls 16 of the container so that the bottom fits snugly but slidably therein.

A box-shaped shell 24 of edible material, preferably baked biscuit, or the like, is slidably positioned in the container 16 on the bottom 20, the shell 24 being open at the upper and lower end thereof and containing a filler of ice cream, marshmallow, or the like, 26 which is supported by the bottom panel 20, as shown in Figure 2.

When the lower edges of the flanges 22 are flush with the lower edges of the container walls 16, the top of the filler 26 and the upper edges of the shell 24 are flush with the upper edges of the container walls. However, when the product is to be consumed, upward pressure is exerted by the fingers on the bottom 18 so that the latter is slid upwardly in the container as shown by the dotted lines 28 in Figure 2, thus sliding the shell 24 and the filler 26 therein upwardly to project from the container as shown at 30 for convenient consumption.

It is to be noted that although in the accompanying drawings the container, shell and filler have been shown as being rectangular in horizontal section, the same may obviously be triangular, circular, oval, or of any other suitable configuration. When the product is manufactured, the shell 24 is positioned in the container 12 and molten ice cream is poured into the shell and subsequently frozen, so as to provide the filler 26.

In the modified embodiment of the invention which is illustrated in the accompanying Figure 5, the construction is quite similar to that in the embodiment already described, insofar that a container 40 is provided with a flanged, slidable bottom 42 and a shell 44 is slidably positioned in the container on the bottom for upward projection from the container when the bottom is slid upwardly.

However, while the aforementioned shell 24 is open at the top and bottom thereof, the shell 44 is substantially U-shaped in configuration, comprising a bottom portion 46 and a pair of side walls 48 which receive a filler of ice cream therebetween so that the filler is supported by the bottom portion 46, as will be clearly apparent.

In this modified form of construction, the container and shell are box-shaped but substantially flat in configuration, the shell being open at the ends thereof, as indicated at 50, while the side walls 48 slidably engage two opposite side walls of the container 40.

It is believed that the advantages and use of the invention will be clearly understood from the foregoing disclosure and, accordingly, further description thereof at this point is deemed unnecessary.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

A food product comprising a non-edible box-shaped container having an open top and including a set of side walls and an upwardly slidable bottom, downturned flanges provided at marginal edges of said bottom and slidably engaging inner surfaces of said side walls, a box-shaped shell of edible material slidably positioned in said container and having open upper and lower ends, the lower edge of said shell resting on said bottom, and an edible filler provided in the shell and supported by said bottom, whereby the shell and said filler may be projected through the open top of said container when the bottom is slid upwardly.

JULIUS H. LIPSHUTZ.

REFERENCES CITED

The following references are of record in the file of this patent:

UNITED STATES PATENTS

| Number | Name | Date |
|---|---|---|
| 1,214,168 | Johnson et al. | Jan. 30, 1917 |
| 1,802,306 | Baker | Apr. 21, 1931 |
| 2,005,245 | Stover | June 18, 1935 |
| 2,085,495 | Fulkerson | June 29, 1937 |